US012629308B1

(12) United States Patent
Grande

(10) Patent No.: US 12,629,308 B1
(45) Date of Patent: May 19, 2026

(54) MODULAR ASH STORAGE SYSTEM FOR ACOUSTIC GUITARS

(71) Applicant: Michael Grande, Marlboro, NJ (US)

(72) Inventor: Michael Grande, Marlboro, NJ (US)

( * ) Notice: Subject to any disclaimer, the term of this patent is extended or adjusted under 35 U.S.C. 154(b) by 0 days.

(21) Appl. No.: 19/060,743

(22) Filed: Feb. 23, 2025

(51) Int. Cl.
*A61G 17/08* (2006.01)
*G10D 3/00* (2020.01)

(52) U.S. Cl.
CPC ............... *A61G 17/08* (2013.01); *G10D 3/00* (2013.01)

(58) Field of Classification Search
CPC ............ G10D 3/02; G10D 1/085; G10D 1/08; G10D 3/00; A61G 17/08
See application file for complete search history.

(56) References Cited

U.S. PATENT DOCUMENTS

| | | | | |
|---|---|---|---|---|
| 4,649,793 | A * | 3/1987 | Blackshear | G10D 3/00 84/453 |
| 5,883,322 | A * | 3/1999 | Baker | G10D 1/085 84/723 |
| 6,988,299 | B1 * | 1/2006 | Barrette | A61G 17/08 27/1 |
| 7,074,992 | B2 * | 7/2006 | Schmidt | G10D 3/02 84/294 |
| 7,178,209 | B1 * | 2/2007 | Radziewicz | A61G 17/08 27/1 |
| 9,216,129 | B2 * | 12/2015 | Schauf | A61G 17/08 |
| 9,646,581 | B2 * | 5/2017 | Landis | G10D 3/00 |
| 9,750,658 | B1 * | 9/2017 | Ware | A61G 17/08 |
| 9,899,017 | B2 * | 2/2018 | Keeler | G10D 3/02 |
| 9,940,912 | B1 * | 4/2018 | Brandenstein | G10D 3/02 |
| 10,546,562 | B1 * | 1/2020 | Baldevarona | G10D 3/02 |
| 10,770,038 | B1 * | 9/2020 | Going | G10D 3/046 |
| 2012/0312146 | A1 * | 12/2012 | Bekerman | G10H 3/143 84/726 |

(Continued)

FOREIGN PATENT DOCUMENTS

| | | | | |
|---|---|---|---|---|
| CA | 3001700 C | * 3/2021 | | G10D 13/08 |
| CN | 201780769 U | * 3/2011 | | G10D 3/00 |
| CN | 206546716 U | * 10/2017 | | |

(Continued)

OTHER PUBLICATIONS

KR 101582903 B1.*

*Primary Examiner* — Patrick D Hawn
(74) *Attorney, Agent, or Firm* — Sam Pierce

(57) ABSTRACT

The present invention provides a modular ash storage system designed for integration into the body of an acoustic guitar, allowing for the secure and discreet storage of cremated remains. The system includes a cap assembly configured to fit into the sound hole of the guitar, featuring a flexible lip to ensure a snug and removable fit, and an interior threaded section for connecting to an ash container. An attachment component is affixed to the interior surface of the guitar body and includes a mounting point to which the ash container is securely attached. The ash container is lightweight and suspended within the interior of the guitar to prevent interference with the instrument's acoustic properties. The modular design allows for easy installation and removal without requiring permanent modifications to the guitar, offering a meaningful and discreet method of memorialization while preserving the instrument's aesthetic and functional integrity.

8 Claims, 7 Drawing Sheets

(56) References Cited

U.S. PATENT DOCUMENTS

| | | | | |
|---|---|---|---|---|
| 2023/0335096 | A1 * | 10/2023 | Spartan .................. | G10H 3/182 |
| 2026/0026993 | A1 * | 1/2026 | McElroy, Jr. .......... | A61G 17/08 |

FOREIGN PATENT DOCUMENTS

| | | | | | |
|---|---|---|---|---|---|
| CN | 209525910 | U | * | 10/2019 | |
| CN | 219610006 | U | * | 8/2023 | |
| CN | 220420238 | U | * | 1/2024 | |
| DE | 202012003352 | U1 | * | 5/2012 | ............. G10D 1/085 |
| JP | 2022001909 | A | * | 1/2022 | |
| KR | 101582903 | B1 | * | 1/2016 | |
| KR | 200493711 | Y1 | * | 5/2021 | ............... G10G 7/00 |

* cited by examiner

MODULAR ASH STORAGE SYSTEM FOR ACOUSTIC GUITARS

BACKGROUND OF THE INVENTION

Field of Invention

The present invention relates generally to memorial devices and, more specifically, to a modular attachment system for storing cremated remains within an acoustic guitar. The invention enables the integration of a discreet ash storage compartment into the sound hole of standard acoustic guitars without altering the guitar's structural or acoustic integrity.

BRIEF SUMMARY OF THE INVENTION

The present invention provides a modular system for securely storing cremated remains within the interior of an acoustic guitar. The system includes a removable cap that fits into the sound hole of any standard acoustic guitar. The cap is constructed with a lip made of silicon or similar materials to ensure a secure fit, and it features a threaded section designed to attach to a bag or container for holding ashes. A cap and ash container system secures the container within the guitar, allowing it to hang suspended inside the guitar body. This design enables the memorial storage of ashes in a discreet and respectful manner while preserving the functionality and acoustic qualities of the guitar. The modular nature of the system ensures compatibility with a wide variety of acoustic guitars.

DETAILED DESCRIPTION

Figure 1:
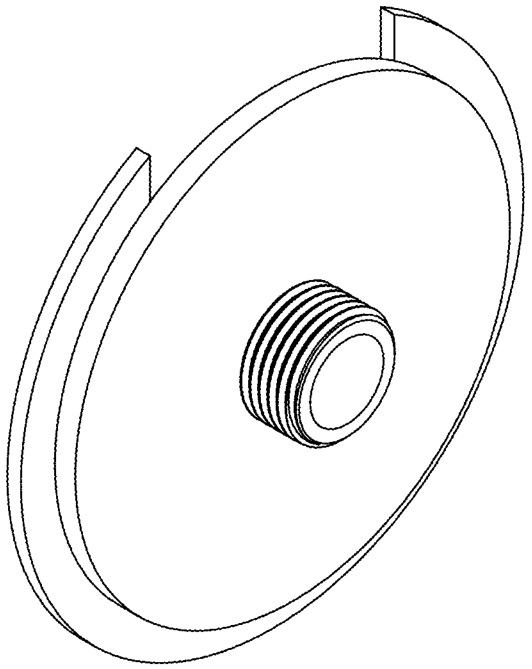
FIG. 1: illustrates a back view.
Figure 2:
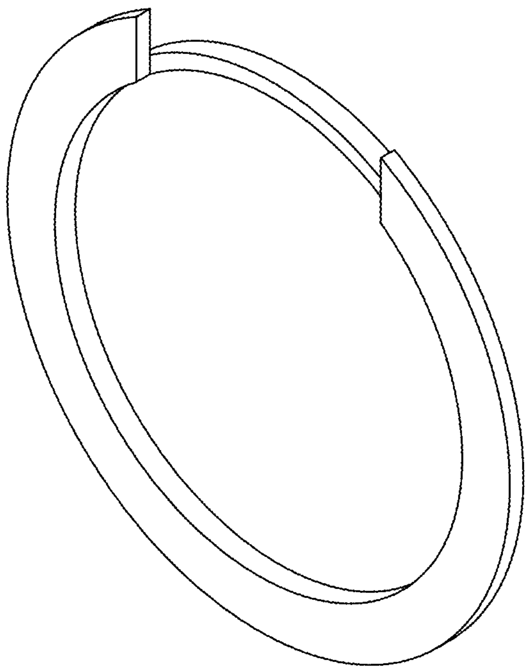
FIG. 2: illustrates a front view.
Figure 3:
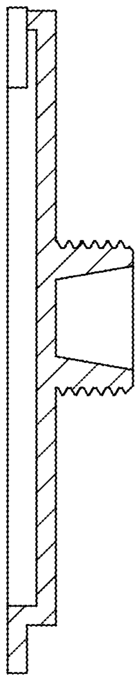
FIG. 3: illustrates a cross-sectional view.
Figure 4:
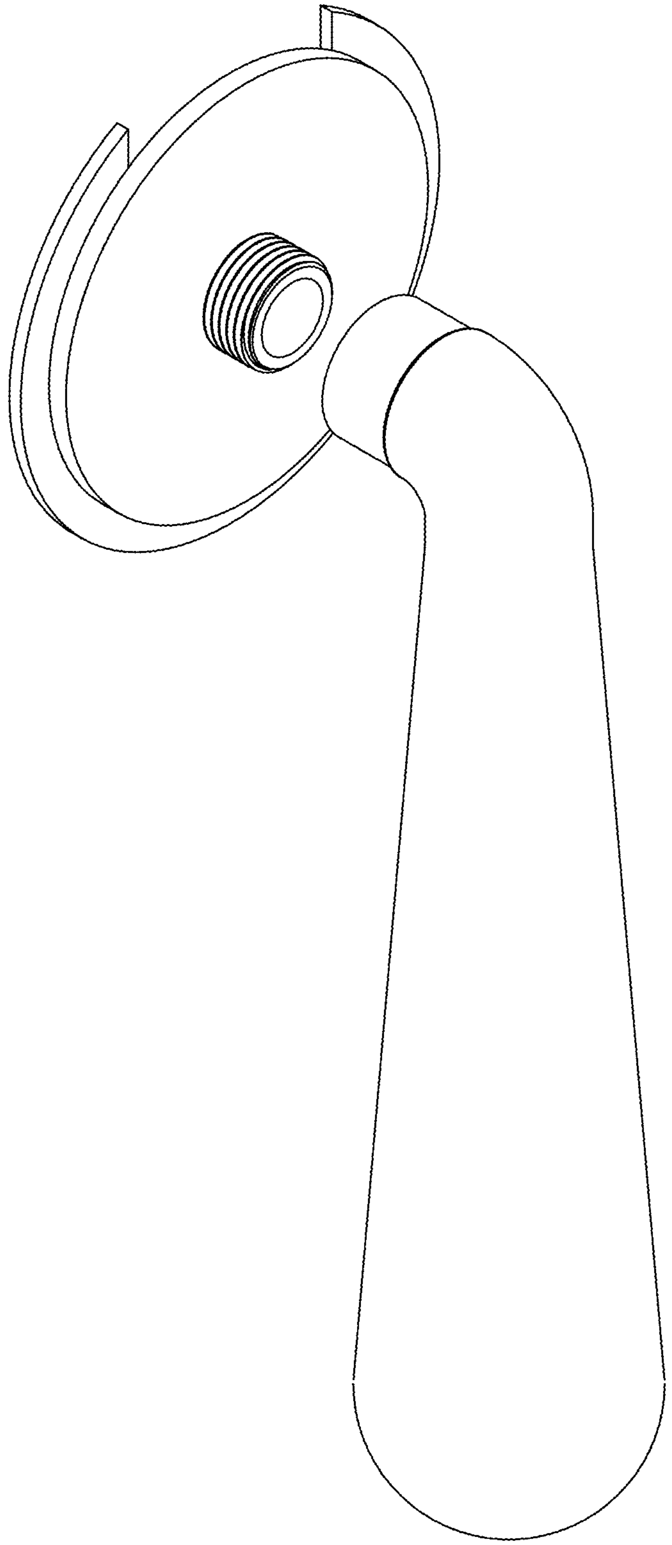
FIG. 4: illustrates an exploded view.
Figure 5:
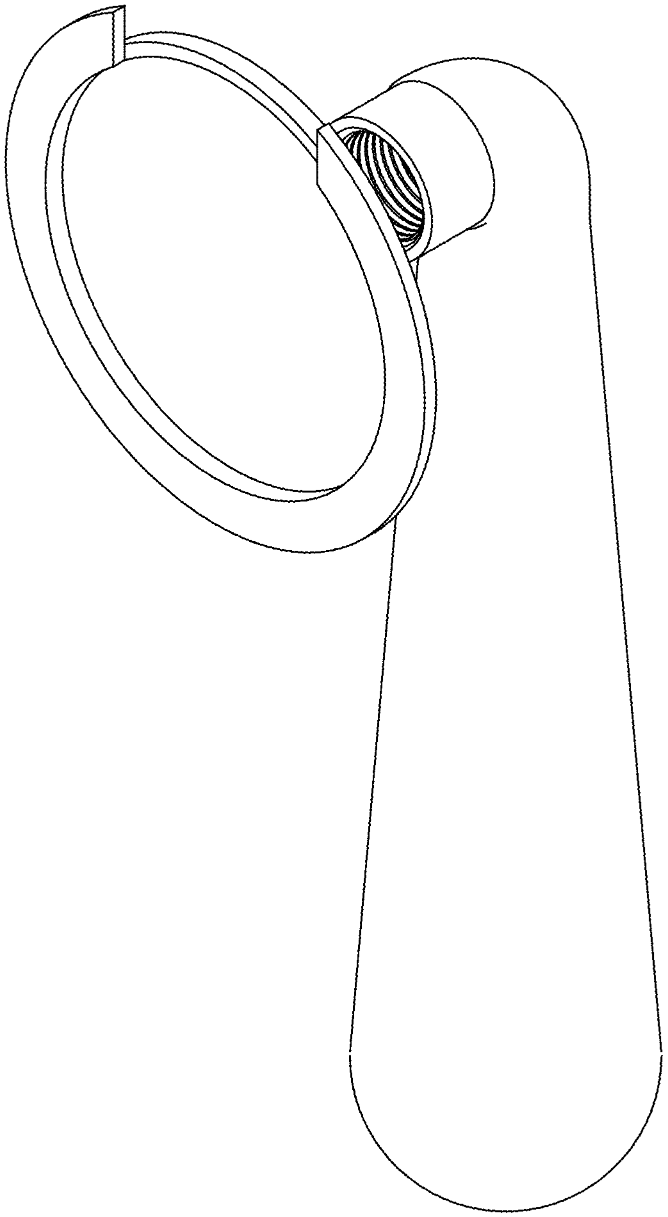
FIG. 5: illustrates a perspective view.
Figure 6:
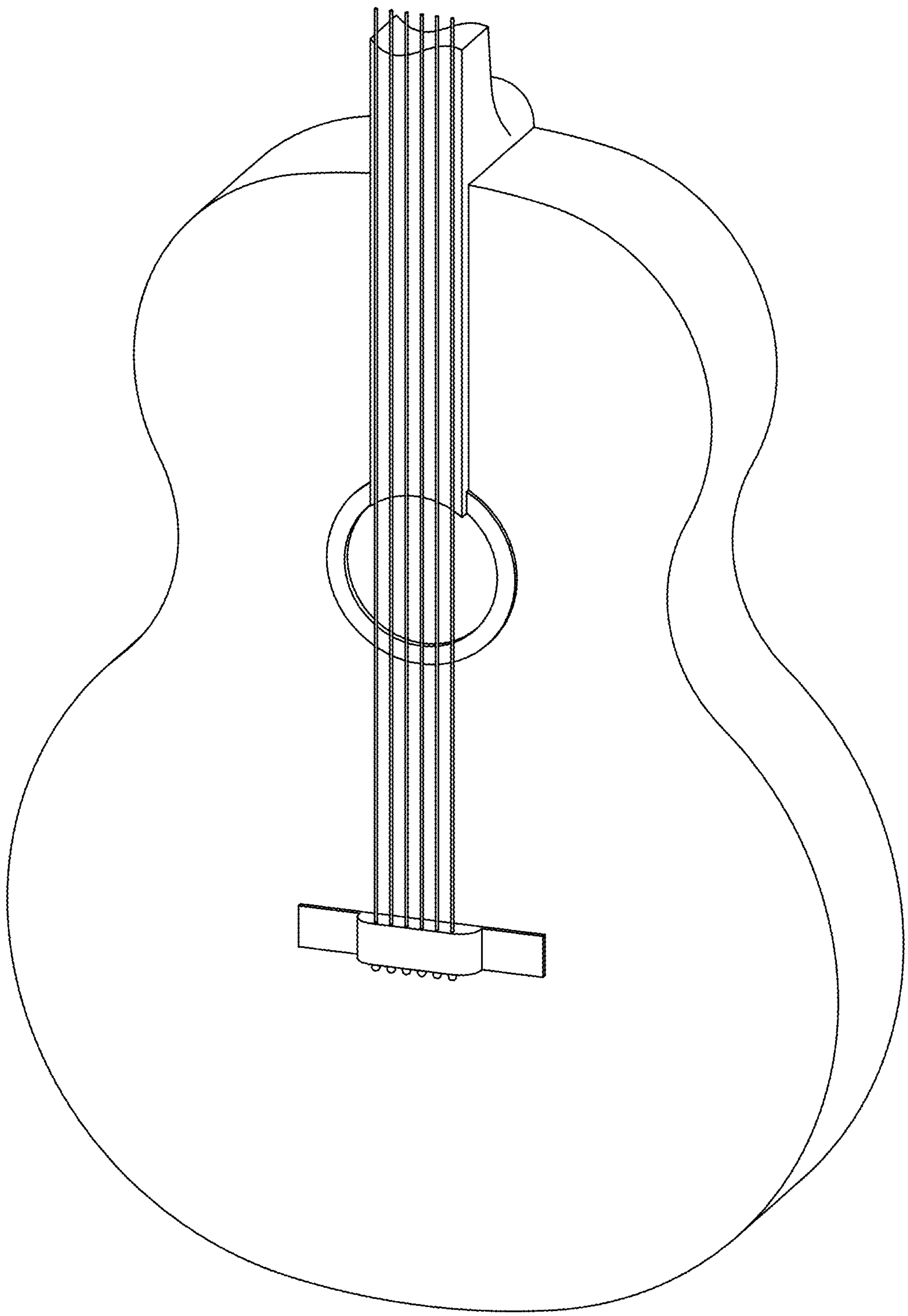
FIG. 6: illustrates a front view.
Figure 7:
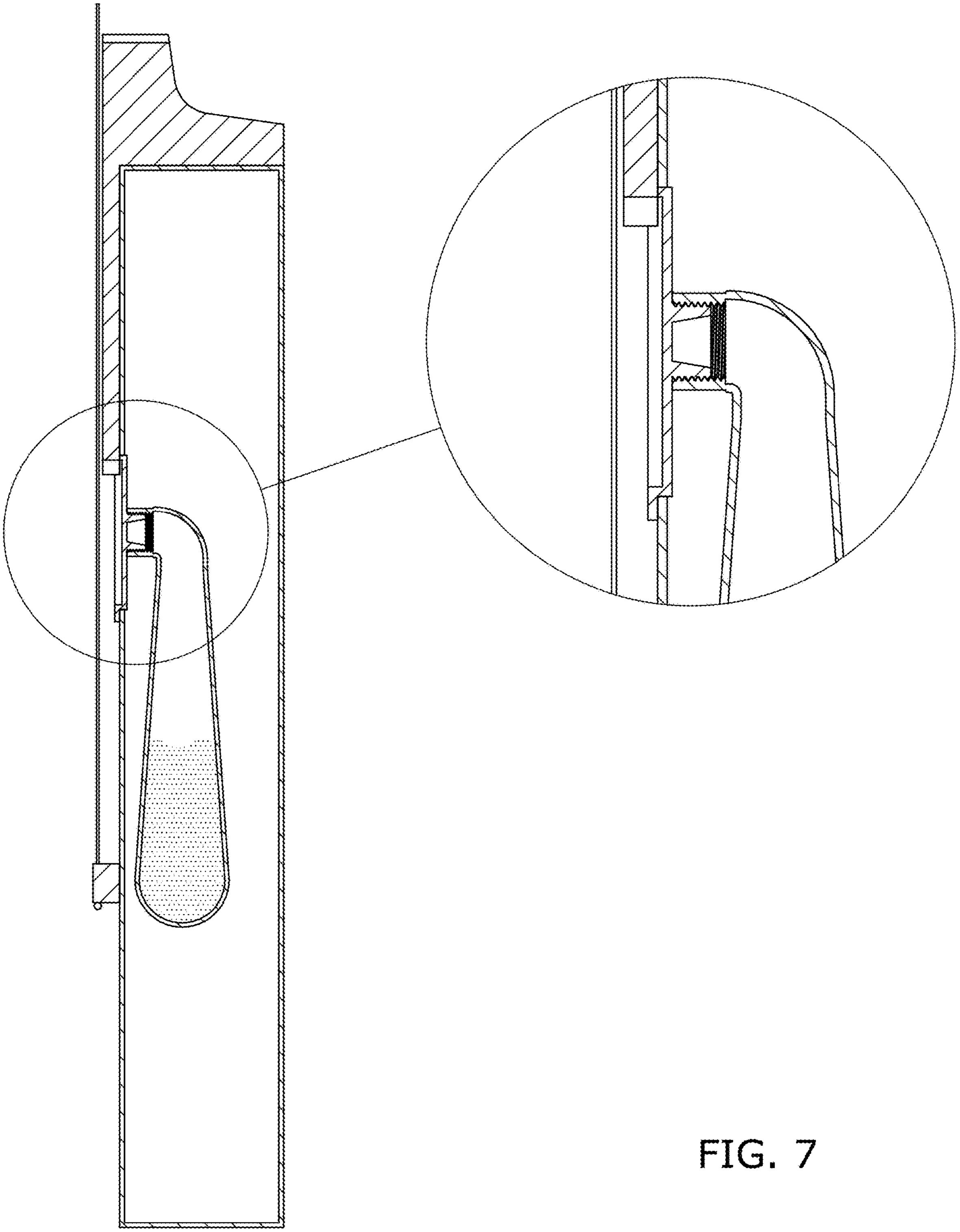
FIG. 7: illustrates a cross-sectional view.

The present invention pertains to a modular ash storage system designed to be integrated into the body of any standard acoustic guitar, allowing for the discreet and secure storage of cremated remains within the guitar. FIGS. 1-7, attached, illustrate the invention. The invention preserves the structural integrity and acoustic performance of the instrument while enabling its use as a memorial device. The system comprises a cap assembly that fits into the sound hole of the guitar, and a lightweight ash container designed to hang securely within the guitar body.

The primary component of the invention is the cap assembly, which is configured to fit snugly into the sound hole of an acoustic guitar. The cap is constructed from a durable material such as silicon, rubber, plastic, wood, or metal, and includes a flexible lip or flange made of silicon or a similar pliable material. This lip ensures a secure, frictional fit between the cap and the sound hole, preventing the cap from becoming dislodged during regular handling or use of the guitar. The cap is further equipped with an interior threaded section, which allows it to securely interface with the ash container, described in detail below.

The ash container is a lightweight, compact vessel designed to hold a symbolic portion of cremated remains. In a preferred embodiment, the ash container is a sealed fabric or plastic bag that attaches securely to the threaded section of the cap. The container is designed to screw into the threaded section of the cap assembly, ensuring a tight and stable connection between the container and the cap. Once secured, the ashes are effectively suspended inside the guitar, preventing any shifting or unwanted movement during use or transport of the instrument.

The modular nature of the ash storage system allows for easy installation and removal without requiring permanent modifications to the guitar. To install the system, the ash container, containing a portion of cremated remains is securely screwed to the cap. The cap assembly is inserted into the sound hole, with the ash container threaded into the cap to ensure a secure connection. The flexible lip of the cap provides a snug fit within the sound hole, holding the entire system in place during regular handling or playing of the guitar.

The invention is designed to offer a discreet and meaningful way to honor loved ones while maintaining the full functionality and acoustic integrity of the guitar. The ash container is lightweight and strategically suspended to ensure that it does not interfere with the vibration or resonance of the soundboard or any other critical components of the instrument. The modular design further allows for easy removal of the cap and ash container, enabling the ashes to be transferred, replaced, or removed as desired, without damaging the guitar or requiring specialized tools.

This invention is particularly suited for musicians and individuals seeking a meaningful and personal method of memorialization. By integrating a symbolic portion of ashes into a functional acoustic guitar, the invention combines music and memory in a unique and innovative way. The system is compatible with a wide variety of acoustic guitar models, ensuring accessibility and ease of use for a diverse range of users.

What is claimed is:

1. A modular ash storage system for use with an acoustic guitar, comprising:

a. a cap configured to fit into the sound hole of an acoustic guitar, the cap having a lip made of a flexible material to ensure a secure and removable fit;

b. a threaded section located on an interior surface of the cap;

c. an ash container configured to hold cremated remains, the ash container including a threaded connection complementary to the threaded section of the cap; and d. wherein the cap is configured to secure the ash container within the interior of the guitar, wherein the cap suspends the ash container to prevent interference with the guitar's structural and acoustic properties, wherein the ash container comprises a sealed bag designed to securely hold cremated remains.

2. The modular ash storage system of claim 1, wherein the cap is made from a material selected from the group consisting of silicon, rubber, plastic, wood, and metal.

3. The modular ash storage system of claim 1, wherein the lip of the cap is constructed from silicon to provide a frictional fit within the sound hole of the guitar.

4. The modular ash storage system of claim 1, wherein the system is configured to allow installation and removal without requiring permanent modifications to the guitar.

5. The modular ash storage system of claim 1, wherein the modular design allows the cap and ash container to be removed and reattached for cleaning, replacement, or transfer of cremated remains.

6. The modular ash storage system of claim 1, further comprising an aesthetic outer surface of the cap.

7. The modular ash storage system of claim 1, wherein the cap is configured to align flush with the surface of the sound hole to preserve the aesthetic and functional design of the guitar.

8. The modular ash storage system of claim 1, wherein the system is adaptable for use in other hollow-bodied or resonant musical instruments.

* * * * *